(12) United States Patent
Novlan

(10) Patent No.: US 11,722,429 B1
(45) Date of Patent: Aug. 8, 2023

(54) RESOURCE ALLOCATION FOR EXTENDED REALITY APPLICATIONS

(71) Applicant: AT&T Intellectual Property I, L.P., Atlanta, GA (US)

(72) Inventor: Thomas Novlan, Jonestown, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 17/651,541

(22) Filed: Feb. 17, 2022

(51) Int. Cl.
| | |
|---|---|
| H04L 12/26 | (2006.01) |
| H04L 12/851 | (2013.01) |
| H04W 16/18 | (2009.01) |
| H04L 47/80 | (2022.01) |
| H04L 47/762 | (2022.01) |
| H04L 47/2416 | (2022.01) |
| H04L 47/2483 | (2022.01) |
| H04L 47/78 | (2022.01) |

(52) U.S. Cl.
CPC ........ H04L 47/803 (2013.01); H04L 47/2416 (2013.01); H04L 47/2483 (2013.01); H04L 47/762 (2013.01); H04L 47/781 (2013.01)

(58) Field of Classification Search
CPC ... H04L 47/803; H04L 47/762; H04L 47/781; H04L 47/2416; H04L 47/2483
USPC ........................................................ 709/226
See application file for complete search history.

(56) References Cited

U.S. PATENT DOCUMENTS

| | | | |
|---|---|---|---|
| 2006/0146721 A1* | 7/2006 | Attar | H04L 47/50 370/412 |
| 2009/0003282 A1 | 1/2009 | Meylan et al. | |
| 2015/0289287 A1 | 10/2015 | Larsson et al. | |
| 2018/0352559 A1* | 12/2018 | Duet | H04W 72/1231 |
| 2021/0203615 A1* | 7/2021 | Roy | G06N 20/00 |
| 2021/0243749 A1* | 8/2021 | Hoang | H04W 74/085 |
| 2021/0289502 A1* | 9/2021 | Ang | H04W 72/042 |

FOREIGN PATENT DOCUMENTS

WO  WO-2020033381 A1 *  2/2020  ............ H04W 24/08

OTHER PUBLICATIONS

3GPP Global Initiative | "3rd Generation Partnership Project; Technical Specification Group Services and System Aspects; Extended Reality (XR) in 5G (Release 16)", 131 pages.

(Continued)

*Primary Examiner* — Ruolei Zong
(74) *Attorney, Agent, or Firm* — Amin, Turocy & Watson, LLP

(57) ABSTRACT

Resource allocation of network traffic comprising extended reality network traffic (e.g., using a computerized tool) is enabled. For example, a method can comprise: determining, by network equipment comprising a processor, whether network traffic via a radio access network comprises extended reality network traffic; in response to a determination that the network traffic comprises the extended reality network traffic, determining, by the network equipment, a traffic characteristic of the extended reality network traffic; based on the traffic characteristic, determining, by the network equipment, a resource allocation for the network traffic; and in response to determining the resource allocation for the network traffic, applying, by the network equipment, the resource allocation to a network node of the radio access network.

20 Claims, 13 Drawing Sheets

(56) References Cited

OTHER PUBLICATIONS

International Search Report and Written Opinion dated Apr. 18, 2023 for PCT Application No. PCT/US2023/012057, 16 pages.
Qualcomm Incorporated: "Potential Enhancements for XR", 3GPP Draft; RI-2104704, 3GPP, vol. RAN WGI, No. e-Meeting; May 10, 2021-May 27, 2021 (May 12, 2021), XP052010955, Retrieved from the Internet: URL: https://ftp.3gpp.org/tsg_ran/WG1_RL1/T SGR1_105-e/Docs/RI-2104704.zip RI-2104704 Potential Enhancements for XR.docx [retrieved on May 12, 2021] paragraphs [02.6], [03.1], [3.2.2] 12 pages.
Rapporteur (Qualcomm): "TR for Study on XR Evaluations for NR", 3GPP Draft; RI-2112812, 3GPP, vol. RAN WGI, No. e-Meeting ; Nov. 11, 2021-Nov. 19, 2021 Nov. 20, 2021 (Nov. 20, 2021), XP052098024, Retrieved from the Internet: URL:https://ftp.3gpp.org/tsg_ran/WG1_RL1/T SGR1_107-e/Docs/RI-2112812.zip TR38.838 v0.2.0.docx [retrieved on Nov. 20, 2021] paragraphs [0006], [6 .1.1.1], [6.1.1.2] 265 pages.
Apple Inc: "Views on enhancements for XR in Rel-18", 3GPP Draft; RI-2111903, 3GPP vol. RAN WGI, No. e-Meeting; Nov. 11, 2021-Nov. 19, 2021 Nov. 6, 2021 (Nov. 6, 2021), XP052075158, Retrieved from the Internet: URL: https://ftp.3gpp.org/tsg_ran/WG1_RL1/T SGR1_107-e/Docs/RI-2111903.zip RI-2111903 Rel-17 XR enhancements v2.docx [retrieved on Nov. 6, 2021] paragraph [2.3.2], 11 pages.

\* cited by examiner

RESOURCE ALLOCATION FOR EXTENDED REALITY APPLICATIONS

TECHNICAL FIELD

The disclosed subject matter relates to network resource allocation and, more particularly, to resource allocation of network traffic associated with extended reality applications.

BACKGROUND

Network resource allocation can be utilized to maintain user experiences of a variety of devices connected to a radio access network (RAN). Data transmission can be prioritized or distributed, for instance, depending on the type of data transmitted. While future radio access networks, such as fifth generation (5G) or sixth generation (6G) networks promise increased bandwidth and reduced latency, network resource allocation is still typically required to accommodate a variety of data transmissions. However, existing network resource allocation solutions do not account for extended reality (XR) network traffic, such as augmented reality (AR), virtual reality (VR), or cloud gaming (CG), which are typically both latency sensitive and data intensive. Consequently, user experience with XR network traffic transmitted via a radio access network, even via a 5G or 6G network, can be suboptimal and can lead to significant performance loss or an inability of a RAN to satisfy system or per-user quality of service (QoS) requirements.

The above-described background relating to network resource allocation is merely intended to provide a contextual overview of some current issues and is not intended to be exhaustive. Other contextual information may become further apparent upon review of the following detailed description.

DETAILED DESCRIPTION

Figure 1:
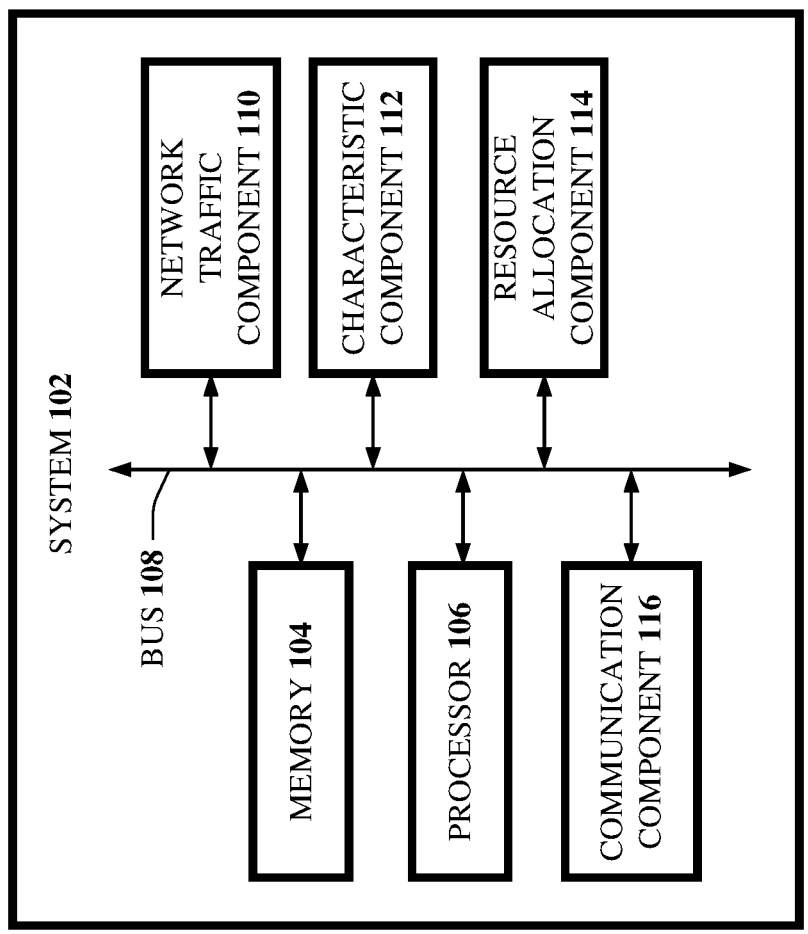
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, network resource allocation can be improved in various ways, and various embodiments are described herein to this end and/or other ends.

Various embodiments herein enable resource allocation for XR applications and corresponding data traffic, for instance, over 5G new radio (NR) networks or 6G networks. Further, various embodiments herein can adapt dynamic resource allocation grants, semi-static resource allocation grants, or scheduling metrics in order to optimize per-user or system performance, for instance, based on RAN awareness of XR-specific traffic flow or QoS parameters.

In various embodiments herein, XR applications (e.g., AR, VR, CG, or other suitable XR applications) can comprise various traffic characteristics that can be accommodated within a 5G or 6G RAN (e.g., gNodeB-central unit (CU) and/or gNodeB-distributed unit (DU)) for resource allocation including, for example, scheduling metrics, and/or dynamic or semi-static resource allocation grants.

According to an embodiment, a system can comprise a processor, and a memory that stores executable instructions that, when executed by the processor, facilitate performance of operations, comprising: in response to a determination that network traffic via a radio access network comprises extended reality network traffic, determining a traffic characteristic of the extended reality network traffic; based on the traffic characteristic, determining a resource allocation for the network traffic; and in response to determining the resource allocation for the network traffic, applying the resource allocation to network nodes of the radio access network.

In various embodiments, the traffic characteristic can comprise a packet size distribution associated with the extended reality network traffic. In further embodiments, the packet size distribution can be generated using a packet size distribution model, and the packet size distribution model can be generated based on machine learning applied to past extended reality network traffic other than the extended reality network traffic. In some implementations, a parameter of the packet size distribution model can comprise a direct parameter. In further implementations, a parameter of the packet size distribution model can comprise an indirect parameter. In various embodiments, the indirect parameter can comprise a type of the packet size distribution model, an extended reality application type indication, a media codec type indication, or a quality of service mapping indication.

In some embodiments, the traffic characteristic can comprise an inter-arrival time distribution between packets transmitted via the radio access network. In various implementations, the inter-arrival time distribution can be generated using an inter-arrival time distribution model, and the inter-arrival time distribution model can be generated based on machine learning applied to past inter-arrival times of other packets other than the packets.

In one or more embodiments, applying the resource allocation to the network nodes of the radio access network can comprise sending a resource allocation policy indicative of the resource allocation to a radio access network node of the radio access network. In various implementations, sending the resource allocation policy to the radio access network node can comprise sending the resource allocation policy to the radio access network node per bearer of the radio access network, or sending the resource allocation policy to the radio access network node per flow identifier of the radio access network. In some embodiments, a first mapping of the resource allocation policy to the radio access network node per bearer of the radio access network can comprise a first one-to-one mapping of the traffic characteristic per bearer, or a second mapping of the resource allocation policy to the radio access network node per flow identifier of the radio access network can comprise a second one-to-one mapping of the traffic characteristic per flow identifier.

In another embodiment, a non-transitory machine-readable medium can comprise executable instructions that, when executed by a processor, facilitate performance of operations, comprising: in response to a determination that network traffic via a radio access network comprises extended reality network traffic, determining a traffic characteristic of the extended reality network traffic; based on the traffic characteristic, determining a resource allocation for the network traffic; and in response to determining the resource allocation for the network traffic, applying the resource allocation to a base station that is part of the radio access network.

In various embodiments, the above operations can further comprise: requesting, from a user equipment executing an extended reality application associated with the extended reality network traffic, assistance data representative of raw data or quantized statistics of extended reality data packets or flows transmitted via the radio access network.

In some embodiments, the above operations can further comprise: based on the traffic characteristic, generating a scheduling metric applicable to the extended reality network traffic. In one or more embodiments, generating the scheduling metric of the extended reality network traffic can comprise generating the scheduling metric of the extended reality network traffic per user equipment of the radio access network, per bearer of the radio access network, or per group flow of the radio access network.

In an embodiment, the above operations can further comprise: based on the traffic characteristic, modifying a semi-static resource allocation grant applicable to the radio access network. In various embodiments, modifying the semi-static resource allocation grant can be based on a historical traffic characteristic associated with the extended reality network traffic.

According to yet another embodiment, a method can comprise: determining, by network equipment comprising a processor, whether network traffic via a radio access network comprises extended reality network traffic; in response to a determination that the network traffic comprises the extended reality network traffic, determining, by the network equipment, a traffic characteristic of the extended reality network traffic; based on the traffic characteristic, determining, by the network equipment, a resource allocation for the network traffic; and in response to determining the resource allocation for the network traffic, applying, by the network equipment, the resource allocation to a network node of the radio access network.

In some embodiments, the above method can further comprise: based on the traffic characteristic, modifying, by the network equipment, a dynamic resource allocation grant applicable to the radio access network. It is noted that, in various embodiments, modifying the dynamic resource allocation grant can be based on a predicted traffic characteristic associated with the extended reality network traffic.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can comprise a computerized tool, which can be configured to perform various operations relating to resource allocation for extended reality applications. The system 102 can comprise one or more of a variety of components, such as memory 104, processor 106, bus 108, network traffic component 110, characteristic component 112, resource allocation component 114, and/or communication component 116.

In various embodiments, one or more of the memory 104, processor 106, bus 108, network traffic component 110, characteristic component 112, resource allocation component 114, and/or communication component 116 can be communicatively or operably coupled (e.g., over a bus or wireless network) to one another to perform one or more functions of the system 102.

In various embodiments herein, the system 102 can comprise a traffic characteristic managing entity, however, in additional embodiments, the system 102 can comprise a gNodeB, a combination of a traffic characteristic managing entity and a gNodeB, or other suitable networks components (e.g., RAN components).

According to an embodiment, the network traffic component 110 can determine whether network traffic via a radio access network comprises extended reality network traffic. The network traffic component 110 can determine whether the network traffic via a radio access network comprises extended reality network traffic based on an evaluation of packets transmitted via a RAN, a type of UE, an indication of the type of network traffic from a UE, a pattern of the network traffic, or otherwise determined. According to an embodiment, the characteristic component 112 can, in response to a determination (e.g., by the network traffic component 110) that network traffic via a radio access network comprises extended reality network traffic, determine a traffic characteristic of the extended reality network traffic. In an embodiment, the characteristic component 112 can provide (e.g., via communication component 116) a communicatively coupled 5G or 6G RAN node (e.g., a gNodeB-CU, gNodeB-DU, and/or a base station) the traffic characteristics, for instance, of a data flow by higher network layers (e.g., an RC layer or PCP). According to an embodiment, traffic characteristics herein can be provided (e.g., by the characteristic component 112 and/or communication component 116) via a core network or RAN interface signaling (e.g., Xn, F1, or N1). In another embodiment, traffic characteristics herein can be provided by a user equipment (UE) device (e.g., UE 502) such as a smartphone, tablet, wearable device, smartwatch, connected vehicle, smart home device, or another suitable device communicatively connected to a corresponding RAN (e.g., via RRC signaling) to the characteristic component 112 (e.g., via communication component 116). In further embodiments, traffic characteristics herein can be provided by a radio interface controller (e.g., via OAM signaling) to the characteristic component 112 (e.g., via communication component 116).

According to an embodiment, a traffic characteristic herein can comprise an inter-arrival time distribution between packets transmitted via the radio access network (e.g., in milliseconds or seconds). In various embodiments, the inter-arrival time distribution can be determined (e.g., by the characteristic component 112) based on defined a statistical model. In further embodiments, the inter-arrival time distribution can be determined using machine learning, as later discussed in greater detail.

According to an embodiment, the resource allocation component 114 can, based on the traffic characteristic, determine a resource allocation for the network traffic. In various embodiments, the resource allocation can comprise prioritization of data flows, for instance, between UE (e.g., UE 502) and a gNodeB (e.g., gNodeB 504) or RAN. In this regard, the resource allocation component 114 can apply weight to one or more data flows, for instance, based on the traffic characteristic. According to an example, the resource allocation component 114 can apply weight to eMBB traffic (e.g., comprising one type of traffic characteristic) differently from XR traffic (e.g., comprising a second type of traffic characteristic) in order to maintain optimal or defined XR traffic flow.

According to an embodiment, the communication component 116 can, in response to determining the resource allocation for the network traffic, apply the resource allocation to a network node (e.g., gNodeB) or network nodes of the radio access network, or to a base station that is part of the radio access network. According to an implementation, the resource allocation can be provided within protocol layers of a RAN node (e.g., a gNodeB) (e.g., in RLC or MAC headers).

In one or more embodiments, applying (e.g., by the communication component 116) the resource allocation to the network nodes of the radio access network can comprise sending (e.g., via the communication component 116) a resource allocation policy indicative of the resource allocation to a radio access network node (e.g., a gNodeB, such as gNodeB 504) of the radio access network. In this regard, the communication component 116 can send the resource allocation policy to the radio access network node per bearer of the radio access network, or send the resource allocation policy to the radio access network node per flow identifier of the radio access network. It is noted that for each bearer, there can exist a plurality of data flows (e.g., comprising respective flow IDs). In various embodiments herein, XR traffic can comprise multiple flows, for instance, because XR traffic often comprises an audio component, a video component, and a user interaction component. In this regard, a bearer component can be utilized for an overall connection (e.g., of an XR application to a gNodeB via a RAN). According to an embodiment, the traffic characteristic can be provided (e.g., by the communication component 116) to a RAN node (e.g., gNodeB-CU and/or gNodeB-DU) on a per-bearer basis or a per-flow ID basis. It is noted that a first mapping of the resource allocation policy to the radio access network node per bearer of the radio access network can comprise a first one-to-one mapping of the traffic characteristic per bearer, or a second mapping of the resource allocation policy to the radio access network node per flow identifier of the radio access network can comprise a second one-to-one mapping of the traffic characteristic per flow identifier. In this regard, the mapping (e.g., the first mapping, the second mapping, or other suitable mapping) of traffic characteristic to a respective bearer or flow ID can be provided (e.g., using the communication component 116) via core network signaling or via a corresponding OAM interface (e.g., via a radio interface controller (RIC)). According to an embodiment, the traffic characteristic can be indicated using individual information elements (IEs) via a core network of a RAN or via OAM signaling. In another embodiment, the traffic characteristic can be indicated using a defined mapping table. In this regard, an index to a mapping table can be associated with a bearer and/or flow ID. In an embodiment, the traffic characteristic to bearer and/or flow ID mapping can be 1:1, and unique traffic a characteristic can be provided (e.g., via the using the resource allocation component 114 or communication component 116) for each bearer and/or flow ID. With 1:1 mapping, each bearer flow can comprise an individual XR traffic characteristic. In another embodiment, the traffic characteristic to bearer and/or flow ID mapping can be 1:N, and a traffic characteristic can be commonly provided (e.g., via the using the resource allocation component 114 or communication component 116) for a subset of all bearers and/or flow IDs. For example, multiple UE (e.g., UE 502) with the same or similar types of XR traffic can be grouped together in order to group signaling and/or save network overhead (e.g., for a corresponding RAN). 1:N grouping can be based on a QoS characteristic (e.g., a QCI or 5QI level). In this regard, UE's that comprise a common QCI or 5QI level can comprise a common XR traffic characteristic associated with that QCI or 5QI level. However, if a threshold difference exists between XR traffic among the UE's, the one or more UE's can be removed from a group, and can be switched to 1:1 mapping. With 1:N mapping, grouping of the traffic characteristics can be provided (e.g., using the resource allocation component 114 or communication component 116) via higher layer signaling. In an implementation, the grouping can be configured (e.g., using the resource allocation component 114 or communication component 116) based on QoS characteristics (e.g., a QCI or 5QI level). In another example, the grouping can be configured (e.g., using the resource allocation component 114 or communication component 116) based on traffic type (e.g., virtual reality, augmented reality, cloud gaming, other suitable extended reality traffic).

It is noted that the communication component 116 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

Figure 2:
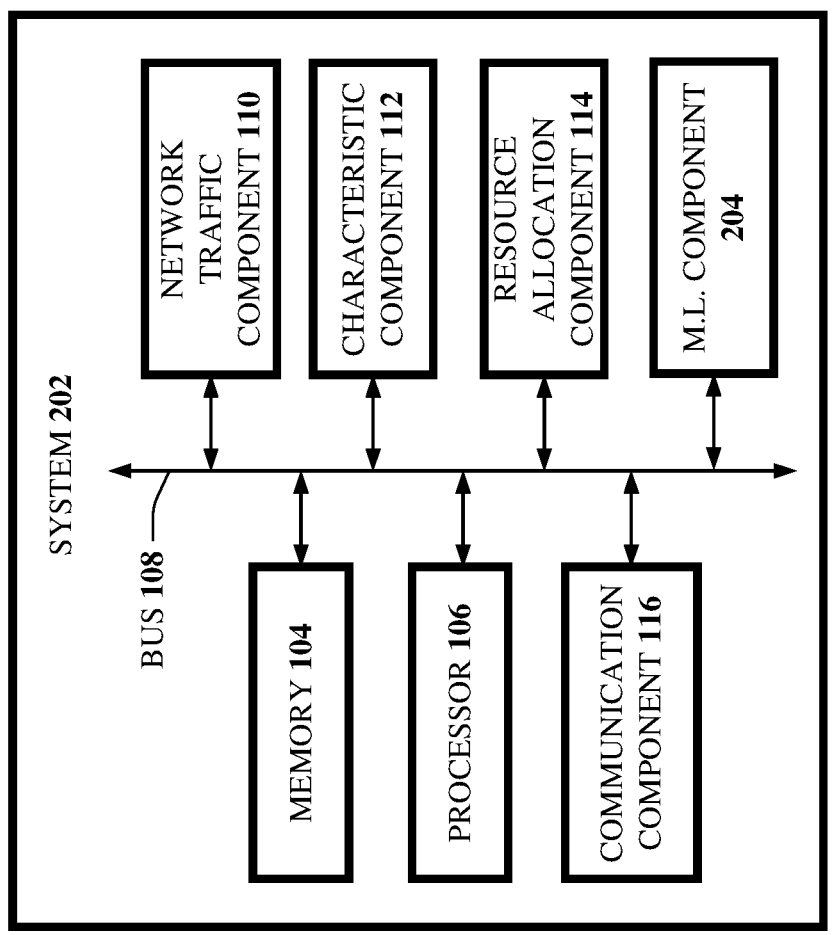
FIG. 2 is a block diagram of an exemplary system in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to resource allocation for extended reality applications. The system 202 can be similar to system 102, and can comprise one or more of a variety of components, such as memory 104, processor 106, bus 108, network traffic component 110, characteristic component 112, resource allocation component 114, and/or communication component 116. The system 202 can additionally comprise a machine learning (M.L.) component 204.

In various embodiments, one or more of the memory 104, processor 106, bus 108 network traffic component 110, characteristic component 112, resource allocation component 114, communication component 116, and/or M.L. component 204 can be communicatively or operably coupled (e.g., over a bus or wireless network) to one another to perform one or more functions of the system 202.

As previous discussed herein, a traffic characteristic can comprise a packet size distribution associated with the extended reality network traffic. According to an embodiment, the packet size distribution can be generated (e.g., by the characteristic component 112 or M.L. component 204) using a packet size distribution model. In this regard, the packet size distribution model can be generated (e.g., by the M.L. component 204) based on machine learning applied to past extended reality network traffic (e.g., over a RAN) other than the extended reality network traffic. In various embodiments, the traffic characteristic can comprise a packet size distribution associated with the extended reality network traffic. In one or more embodiments, the traffic characteristics can comprise a historical or predicted packet size distribution (e.g., in kilobytes or megabytes). In further embodiments, the packet size distribution model can be generated based on a statistical model. In various embodiments, a parameter of the packet size distribution model can comprise a direct parameter. Such a direct packet size distribution parameter (e.g., direct parameter) can comprise one or more of a mean, variance, maximum, median, or minimum of the distribution, or other suitable direct values. In further embodiments, a parameter of the packet size distribution model comprises an indirect parameter. It is noted that an indirect parameter can comprise a type of the packet size distribution model (e.g., Gaussian, Exponential, Fixed Arrival, or Lognormal), an extended reality application type indication (e.g., augmented reality, virtual reality, cloud gaming, or another suitable extended reality type), a media codec type indication, or a quality of service mapping indication (e.g., based on a QCI or 5QI value). As previously discussed herein, a traffic characteristic can additionally or alternatively comprise an inter-arrival time distribution between packets transmitted via the radio access network. According to an embodiment, the inter-arrival time distribution can be generated (e.g., by the characteristic component 112 or M.L. component 204) using an inter-arrival time distribution model. In this regard, the inter-arrival time distribution model can be generated (e.g., by the M.L. component 204) based on machine learning applied to past inter-arrival times of other packets other than the packets. In further embodiments, inter-arrival time distribution can be generated (e.g., using a resource allocation component 114) based on a defined statistical model. It is noted that packet size distribution and/or inter-arrival time can be employed to help determine (e.g., using a resource allocation component 114) suitable resource allocations and/or to enable anticipation (e.g., using a resource allocation component 114 or M.L. component 204) of future resource allocations needs (e.g., in order to prepare in advance for future XR traffic flows).

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (A.I.) model and/or M.L. or an M.L. model that can learn to perform the above or below described functions (e.g., via training using historical training data and/or feedback data).

In some embodiments, M.L. component 204 can comprise an A.I. and/or M.L. model that can be trained (e.g., via supervised and/or unsupervised techniques) to perform the above or below-described functions using historical training data comprising various context conditions that correspond to various augmented network optimization operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by the M.L. component 204. In this example, such feedback data can comprise the various instructions described above/below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, an M.L. component 204 herein can initiate an operation associated with determining various thresholds herein.

In an embodiment, the M.L. component 204 can perform a utility-based analysis that factors cost of initiating the above-described operations versus benefit. In this embodiment, the M.L. component 204 can use one or more additional context conditions to determine various thresholds herein.

To facilitate the above-described functions, a M.L. component 204 herein can perform classifications, correlations, inferences, and/or expressions associated with principles of artificial intelligence. For instance, the M.L. component 204 can employ an automatic classification system and/or an automatic classification. In one example, the M.L. component 204 can employ a probabilistic and/or statistical-based analysis (e.g., factoring into the analysis utilities and costs) to learn and/or generate inferences. The M.L. component 204 can employ any suitable machine-learning based techniques, statistical-based techniques and/or probabilistic-based techniques. For example, the M.L. component 204 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the M.L. component 204 can perform a set of machine-learning computations. For instance, the M.L. component 204 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 3:
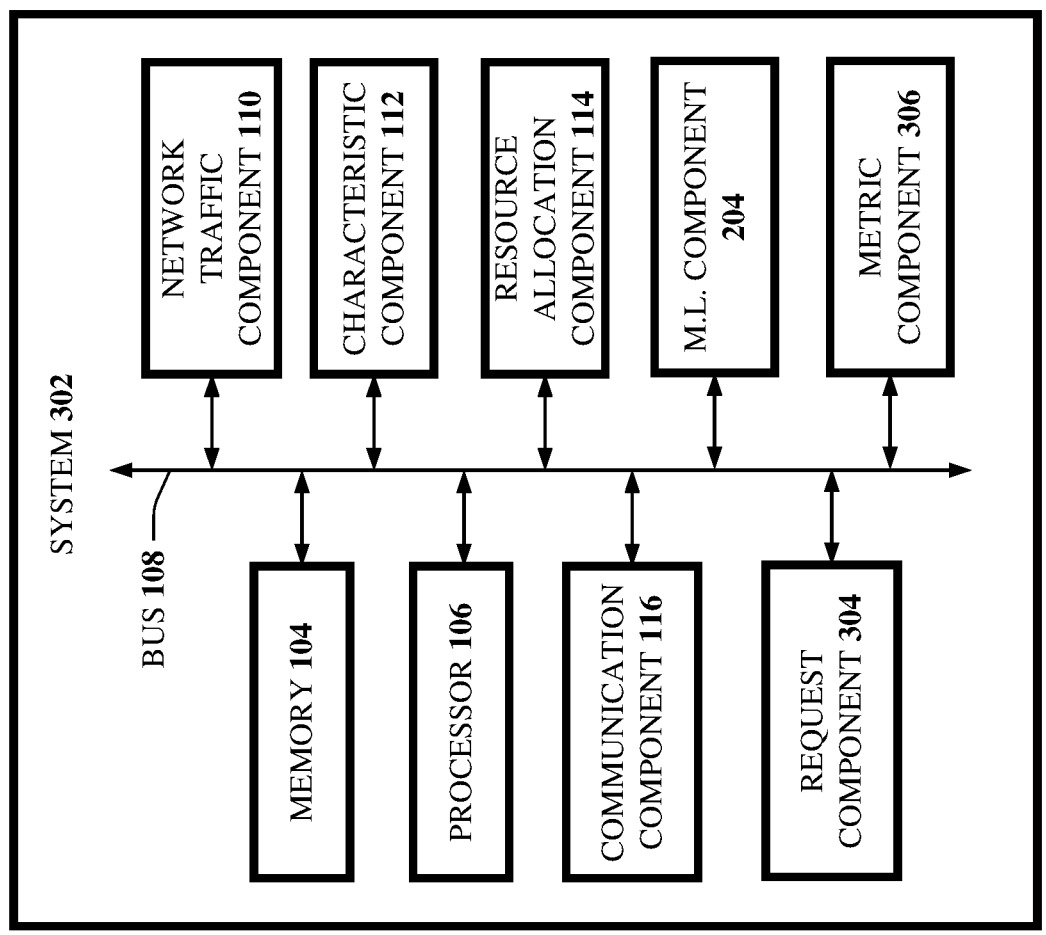
FIG. 3 is a block diagram of an exemplary system in accordance with one or more embodiments described herein.

With reference to FIG. 3, there is illustrated an example, non-limiting system 302 in accordance with one or more embodiments herein. System 302 can comprise a computerized tool, which can be configured to perform various operations relating to resource allocation for extended reality applications. The system 302 can be similar to system 202, and can comprise one or more of a variety of components, such as memory 104, processor 106, bus 108, network traffic component 110, characteristic component 112, resource allocation component 114, communication component 116, and/or M.L. component 204. The system 302 can additionally comprise a request component 304 and/or metric component 306.

In various embodiments, one or more of the memory 104, processor 106, bus 108 network traffic component 110, characteristic component 112, resource allocation component 114, communication component 116, M.L. component 204, request component 304, and/or metric component 306 can be communicatively or operably coupled (e.g., over a bus or wireless network) to one another to perform one or more functions of the system 302.

According to an embodiment, the request component 304 can request, from a user equipment (e.g., UE 502) executing an extended reality application associated with the extended reality network traffic, assistance data representative of raw data or quantized statistics of extended reality data packets or flows transmitted via the radio access network.

According to an embodiment, the metric component 306 can, based on the traffic characteristic, generate a scheduling metric applicable to the extended reality network traffic. In this regard, generating the scheduling metric of the extended reality network traffic can comprise generating (e.g., using the metric component 306) the scheduling metric of the extended reality network traffic per user equipment of the radio access network, per bearer of the radio access network, or per group flow of the radio access network. Further in this regard, the resource allocation component 114 (e.g., a scheduler) or metric component 306 can create or update scheduling metrics on a per-user, per-bearer, per-flow, or per-group flow basis. Such scheduling metrics can comprise, for instance, packet throughput or rate calculations, packet delay calculations, inter-packet or inter-user fairness calculations, priority calculations, or other suitable scheduling metrics. In various implementations, such scheduling metrics can be absolute, relative, or proportionally weighted. According to an embodiment, scheduling metrics herein can be determined (e.g., by the resource allocation component 114 or metric component 306) separately for UE's with extended reality traffic flows, or can be determined jointly with UE's with other traffic types (e.g., eMBB or URLLC). In further embodiments, the traffic characteristics can be linearly (e.g., multiplicative, or exponentially) or non-linearly (e.g., quantizing and table-based mapping) applied to the scheduling metrics (e.g., by the resource allocation component 114 or metric component 306).

According to an embodiment, a traffic characteristic provided to a RAN node (e.g., gNodeB 504) can be directly provided to a resource allocation component 114 (e.g., a scheduler) or a traffic management entity (e.g., traffic characteristic managing entity 506) via an internal gNodeB interface. In another embodiment, the traffic characteristic can be passed from higher network layers to lower network layers at which resource allocation herein can be performed (e.g., a MAC layer). In various embodiments, the traffic characteristic can be encapsulated in lower layer protocol messages (e.g., RLC PDU/SDU and/or MAC PDU) after being received at the higher layers (e.g., a PDCP layer). In another embodiment, the traffic characteristic can be tunneled between upper layers and lower layers where resource allocation is performed (e.g., a MAC layer).

Figure 4:
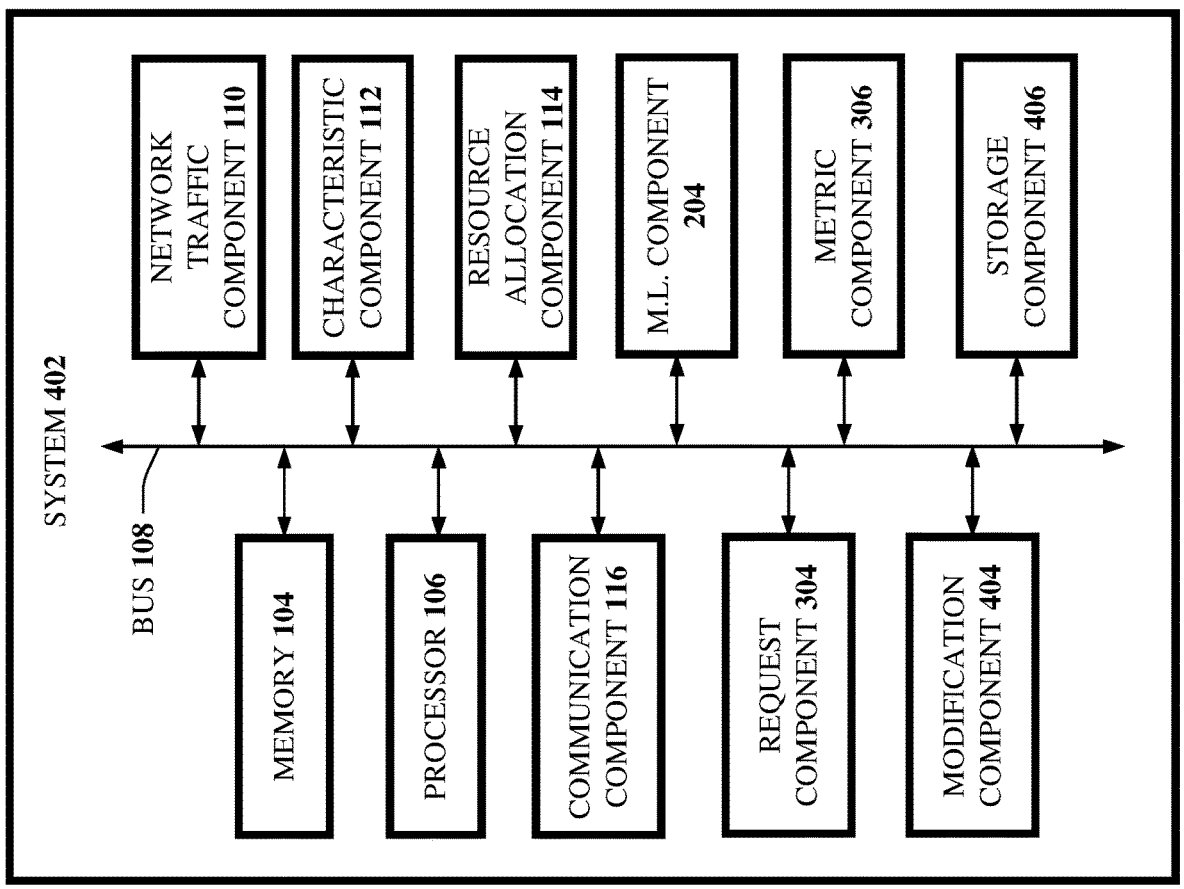
FIG. 4 is a block diagram of an exemplary system in accordance with one or more embodiments described herein.

Turning now to FIG. 4, there is illustrated an example, non-limiting system 402 in accordance with one or more embodiments herein. System 402 can comprise a computerized tool, which can be configured to perform various operations relating to resource allocation for extended reality applications. The system 402 can be similar to system 302, and can comprise one or more of a variety of components, such as memory 104, processor 106, bus 108, network traffic component 110, characteristic component 112, resource allocation component 114, communication component 116, M.L. component 204, request component 304, and/or metric component 306. The system 402 can additionally comprise a modification component 404 and/or storage component 406.

In various embodiments, one or more of the memory 104, processor 106, bus 108 network traffic component 110, characteristic component 112, resource allocation component 114, communication component 116, M.L. component 204, request component 304, metric component 306, modification component 404, and/or storage component 406 can be communicatively or operably coupled (e.g., over a bus or wireless network) to one another to perform one or more functions of the system 402.

According to an embodiment, the modification component 404 can based on the traffic characteristic, modify a semi-static resource allocation grant applicable to the radio access network. In this regard, modifying the semi-static resource allocation grant can be based on a historical traffic characteristic associated with the extended reality network traffic or predicted (e.g., using the M.L. component 204) traffic characteristic associated with the extended reality network traffic. Further in this regard, the storage component 406 can store historical traffic characteristics associated with extended reality network traffic which can be employed by the M.L. component 204 or another component herein. According to an example, one or more semi-persistent scheduling parameters can be modified (e.g., using the modification component 404) based on the traffic characteristic and/or traffic characteristic model (e.g., as opposed to a fixed value). In one embodiment, the traffic characteristics can be utilized by a gNodeB (e.g., gNodeB 504) to adapt parameters related to semi-static resource allocation grants associated with a specific user (e.g., a specific UE), bearer, traffic flow, or group of traffic flows, which can be associated with an extended reality application. According to an embodiment, allocation of uplink resources associated with buffer status reports can be adapted (e.g., using the modification component 404 or M.L. component 204) based on historical or predicted traffic characteristics, such as file size or inter-packet delay. In another embodiment, semi-persistent scheduling parameters can be adapted (e.g., using the modification component 404 or M.L. component 204) to match historical or predicted traffic characteristics, such as file size or inter-packet delay, in a non-uniform manner (e.g., the size of the SPS grants and their periodicity can be indicated in groups of grants with a per-grant size and periodicity). In yet another embodiment, a per-grant indication can be indicated via a bitmap or set of fields within a configured window via signaling (e.g., PDCCH, MAC CE, or RRC signaling).

According to an embodiment, the modification component 404 can, based on the traffic characteristic, modify a dynamic resource allocation grant applicable to the radio access network. In this regard, modifying (e.g., by the modification component 404) the dynamic resource allocation grant can be based on a historical traffic characteristic associated with the extended reality network traffic or predicted traffic characteristic associated with the extended reality network traffic. In this regard, the storage component 406 can store historical traffic characteristics associated with extended reality network traffic which can be employed by the M.L. component 204 or another component herein.

According to an embodiment, the traffic characteristics can be utilized by a gNodeB (e.g., gNodeB 504) to adapt parameters related to dynamic resource allocation grants associated with a specific user, bearer, traffic flow, or group of traffic flows, which can be associated with an extended reality application. In an embodiment, allocation of downlink resources for PDSCH receptions and/or UL resources for UL PUSCH transmissions can be adapted (e.g., using a modification component 404) to match historical or predicted traffic characteristics, such as file size or inter-packet delay in a non-uniform manner (e.g., TBS, MCS, and HARQ timeline). In another embodiment, a group of dynamic resource allocation indications (e.g., via PDCCH) can be indicated on a per-user, bearer, traffic flow, or group of traffic flows via L1/L2 signaling (e.g., PDCCH or MAC CE). A size and frequency of the group of dynamic indications can be adapted, for instance, based on the historical or predicted traffic characteristics such as file size or inter-packet delay. In an implementation, an ACK/NACK timeline (e.g., a number of symbols or slots before the next feedback indication is sent) can be adapted on a per-user, bearer, traffic flow, or group of traffic flow basis.

Figure 5:
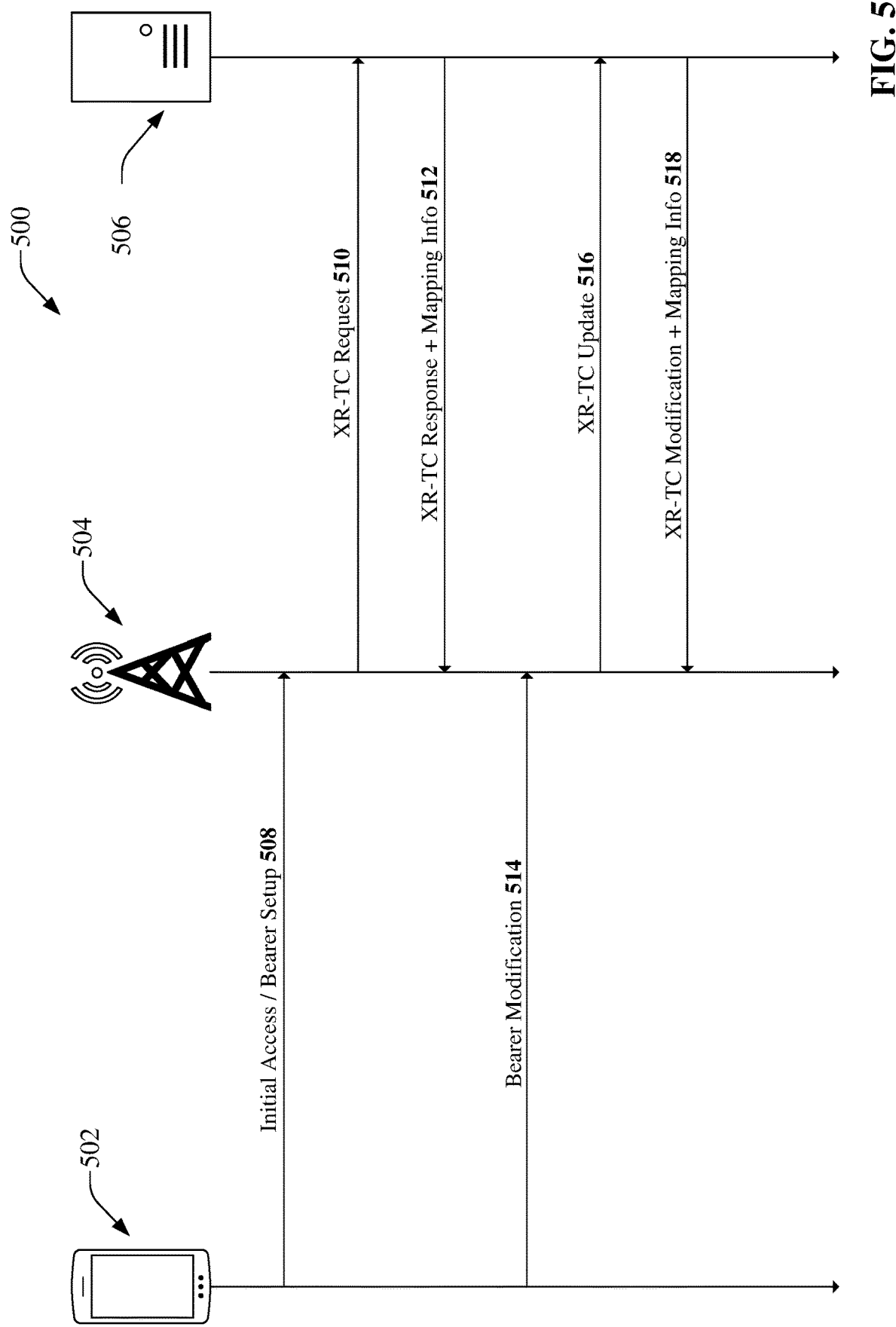
FIG. 5 is a block diagram of exemplary process flow in accordance with one or more embodiments described herein.

FIG. 5 illustrates an exemplary downlink extended reality traffic characteristic signaling flow 500 in accordance with various embodiments herein. In various embodiments, signaling flow 500 can be utilized for configuring a traffic characteristic for a UE (e.g., UE 502) with an extended reality service in the downlink direction. After initial access/bearer setup 508, gNodeB 504 can request a traffic characteristic from a traffic characteristic managing entity 506 at 510. If the request is determined to be valid by the traffic characteristic managing entity 506, the traffic characteristic managing entity 506 can provide the individual traffic characteristic and/or the mapping information to the gNodeB 504 at 512. In the event of a bearer reconfiguration at 514, the gNodeB 504 can request an update of the traffic characteristic (e.g., due to changes in the service type and/or QoS characteristics) at 514. At 516, the gNodeB 504 can request a traffic characteristic update from the traffic characteristic managing entity 506. At 518, the traffic characteristic managing entity 506 can provide the updated traffic characteristic and/or the mapping information to the gNodeB 504. According to an embodiment, any time that a bearer is modified, there can exist a need to update associated traffic characteristics. For example, a UE 502 can switch from a lower quality service to a higher quality service, and new corresponding bearers can be added (e.g., by the traffic characteristic managing entity 506 or gNodeB 504). In this regard, an update to mapping information herein or a subset of the mapping information can be generated (e.g., by the traffic characteristic managing entity 506).

Figure 6:
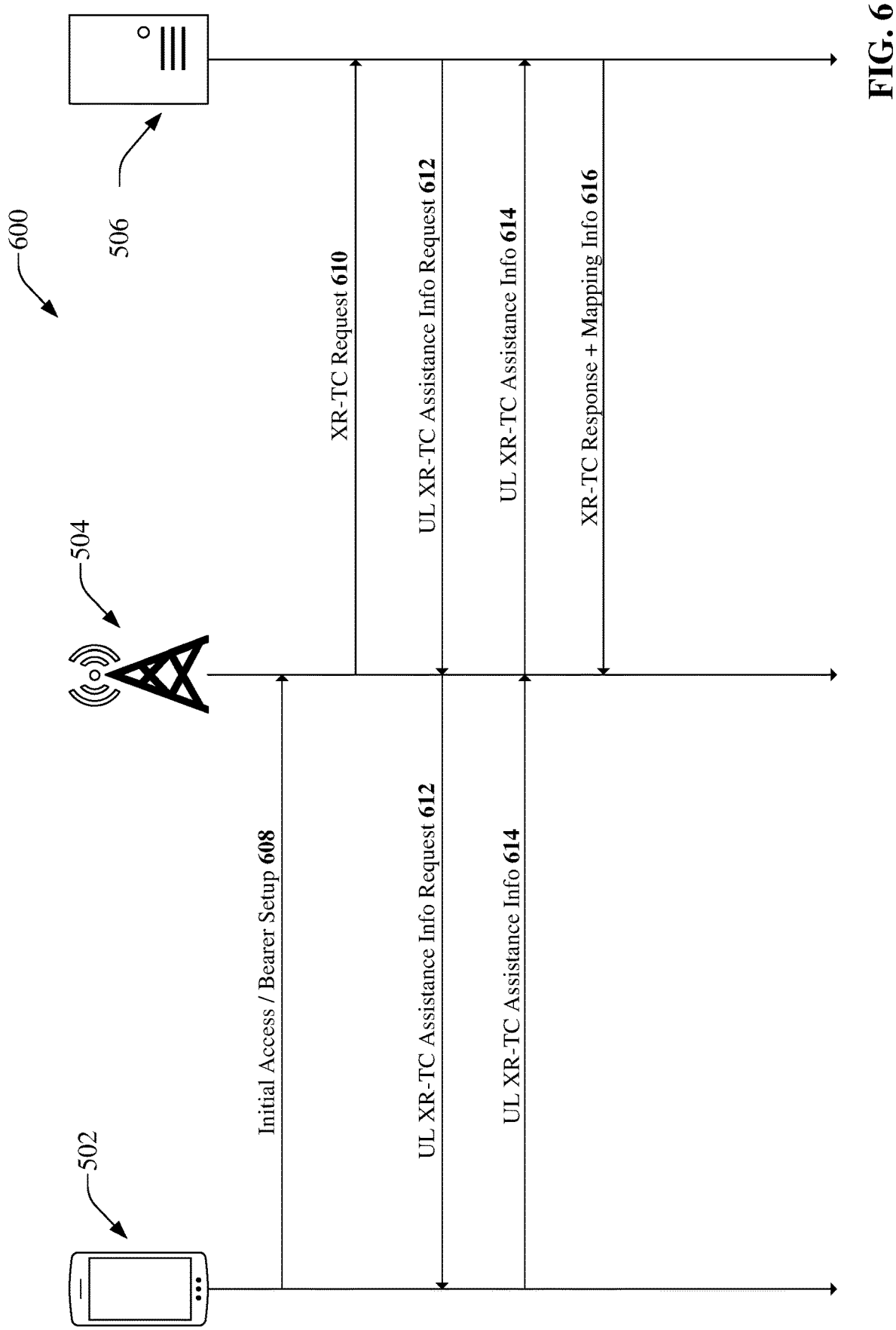
FIG. 6 is a block diagram of exemplary process flow in accordance with one or more embodiments described herein.

FIG. 6 illustrates an exemplary uplink extended reality traffic characteristic signaling flow 600 in accordance with various embodiments herein. After initial access/bearer setup at 608, gNodeB 504 can request a traffic characteristic from a traffic characteristic managing entity 506 at 610. In various embodiments, the traffic characteristic managing entity 506 can request, at 612, assistance data from the UE 502, for instance, because an extended reality application can be fully or partially rendered locally (e.g., on a UE 502) due to latency and/or processing capability constraints. In various embodiments, the assistance data herein can comprise raw data or quantized statistics of the extended reality packets and/or flows. In one or more embodiments, the uplink traffic characteristic assistance data can be provided (e.g., by the traffic characteristic managing entity 506 or gNodeB 504) via higher layer control signaling (e.g., RRC messages) or can be provided directly to the traffic characteristic, for instance, via a data bearer (e.g., a regular IP-based traffic session). After the assistance data is provided by the UE 502 at 614, the traffic characteristic response and/or mapping info can be provided, at 616, by the traffic characteristic managing entity 506 to the gNodeB 504. In various embodiments, the UE 502 can comprise M.L. capability in order to predict the traffic characteristic. The UE 502 can provide the assistance data directly to the traffic characteristic managing entity 506 or via RRC messages processed by the gNodeB 504 and forwarded to the traffic characteristic managing entity 506.

In various embodiments herein, XR applications can be broadly divided into three application categories: enterprise applications, consumer applications, and mission critical applications. Though difference between the categories of XR applications can exist, XR applications typically comprise at least video streaming in some form and user interaction. Examples of enterprise applications can comprise industrial automation, factory management and maintenance, and remote training use cases such as XR multimedia streaming, XR conversational, XR cloud gaming, AR guided assistance at remote locations, AR animated avatar calls, shared spatial data, or other suitable enterprise applications. Examples of consumer applications can comprise shopping and retail experiences, immersive stadium experiences, AR animated avatar calls, use cases requiring XR multimedia streaming, spatial audio multiparty calls Realtime XR sharing, or other suitable consumer applications. First responders can benefit from XR applications, for instance, in mission critical situations. For example, a firefighters can respond to a fire emergency using AR guided assistance and shared spatial data to locate shutoff valves or victims at burning buildings. Similarly, a police office can benefit from XR conversational technology and viewport-dependent streaming, for instance, to locate and collaborate with other first responders.

In various embodiments herein, traffic file size distribution can impact RAN performance for XR applications. Unlike standard mobile broadband (e.g., using a file transfer protocol (FTP)) or video streaming traffic types for interactive applications which are dependent on the user environment, packets for XR applications are not fixed in size, though the packets can be dependent on an encoding rate.

Figure 7:
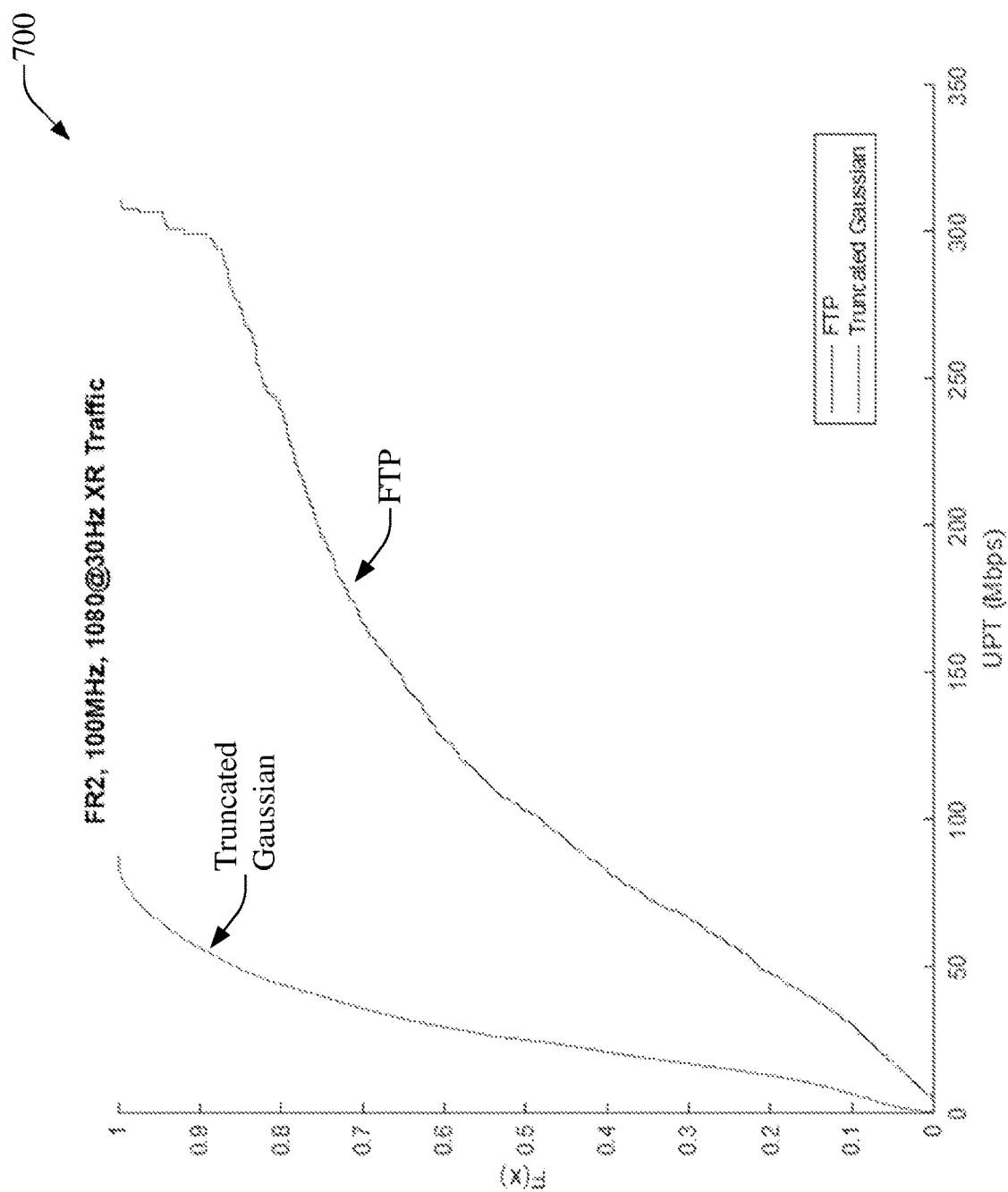
FIG. 7 is a graph of file transfer protocol and truncated gaussian traffic models for extended reality network traffic in accordance with one or more embodiments described herein.

Chart 700 of FIG. 7 illustrates the user perceived throughput for a system simulation of an XR application with an exemplary encoding rate of 1080 p at 30 Hz, modelled as a Truncated Gaussian distribution, and compares it with the respective typical FTP traffic model counterpart with identical offered load (e.g., at 8 Mbps per UE with a fixed file size and random arrivals). In this regard, the Truncated Gaussian and FTP models can result in differing performance curves, which indicates that applying XR media characteristics to an existing FTP traffic model is not sufficient, and both variable file size and fixed inter-arrival times can thus be considered to characterize XR traffic within a 5G or 6G system. For example, FTP traffic can comprise bursts among users, which can be multiplexed by a scheduler herein. XR traffic, however, can often comprise a sustained rate with low latency requirements.

Figure 8:
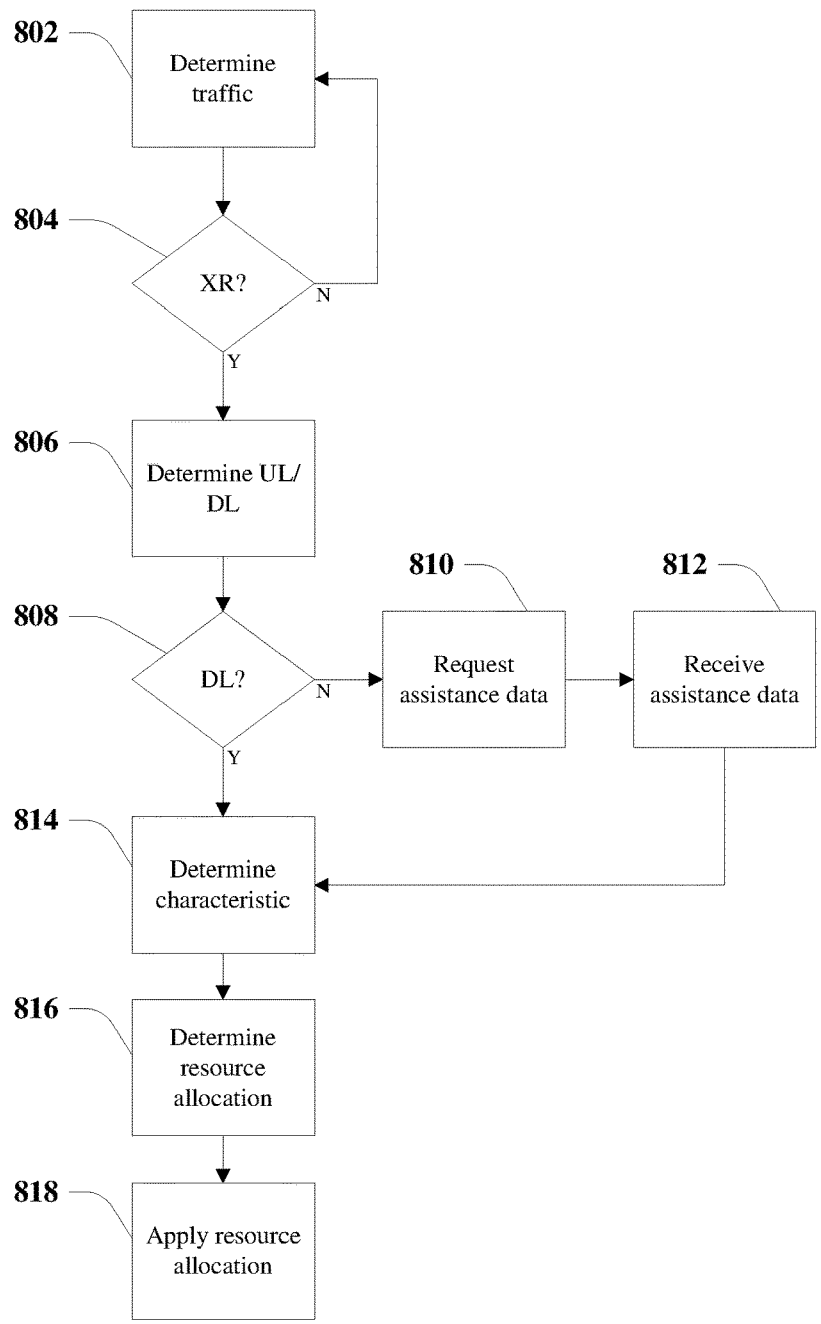
FIG. 8 is a flowchart for a process associated with resource allocation of network traffic in accordance with one or more embodiments described herein.

Turning now to FIG. 8, there is illustrated a flowchart of a process 800 associated with resource allocation of network traffic in accordance with one or more embodiments described herein. At 802 a network traffic component 110 can determine whether network traffic via a RAN comprises extended reality network traffic. At 804, if the traffic does not comprise extended reality network traffic, the process 800 can return to 802. At 804, if the network traffic comprises extended reality network traffic, the process can continue to 806. At 806, the network traffic component 110 can determine whether the extended reality network traffic comprises uplink extended reality network traffic or downlink extended reality network traffic. At 808, if the extended reality network traffic comprises uplink extended reality network traffic (N at 808), the process can proceed to 810, at which assistance data can be requested (e.g., by the network traffic component 110) from a UE. At 812, the assistance data can be received or otherwise accessed (e.g., by the network traffic component 110 or communication component 116 from the UE) and the process can proceed to 814. Additionally, at 808, if the extended reality network traffic comprises downlink extended reality network traffic (Y at 808), the process can proceed to 814. At 814, the characteristic component 112 can determine a traffic characteristic of the extended reality network traffic. At 816, the resource allocation component 114 can, based on the traffic characteristic, determine a resource allocation for the network traffic. At 818, the communication component 116 can apply the resource allocation to a network node or base station of the RAN.

Figure 9:
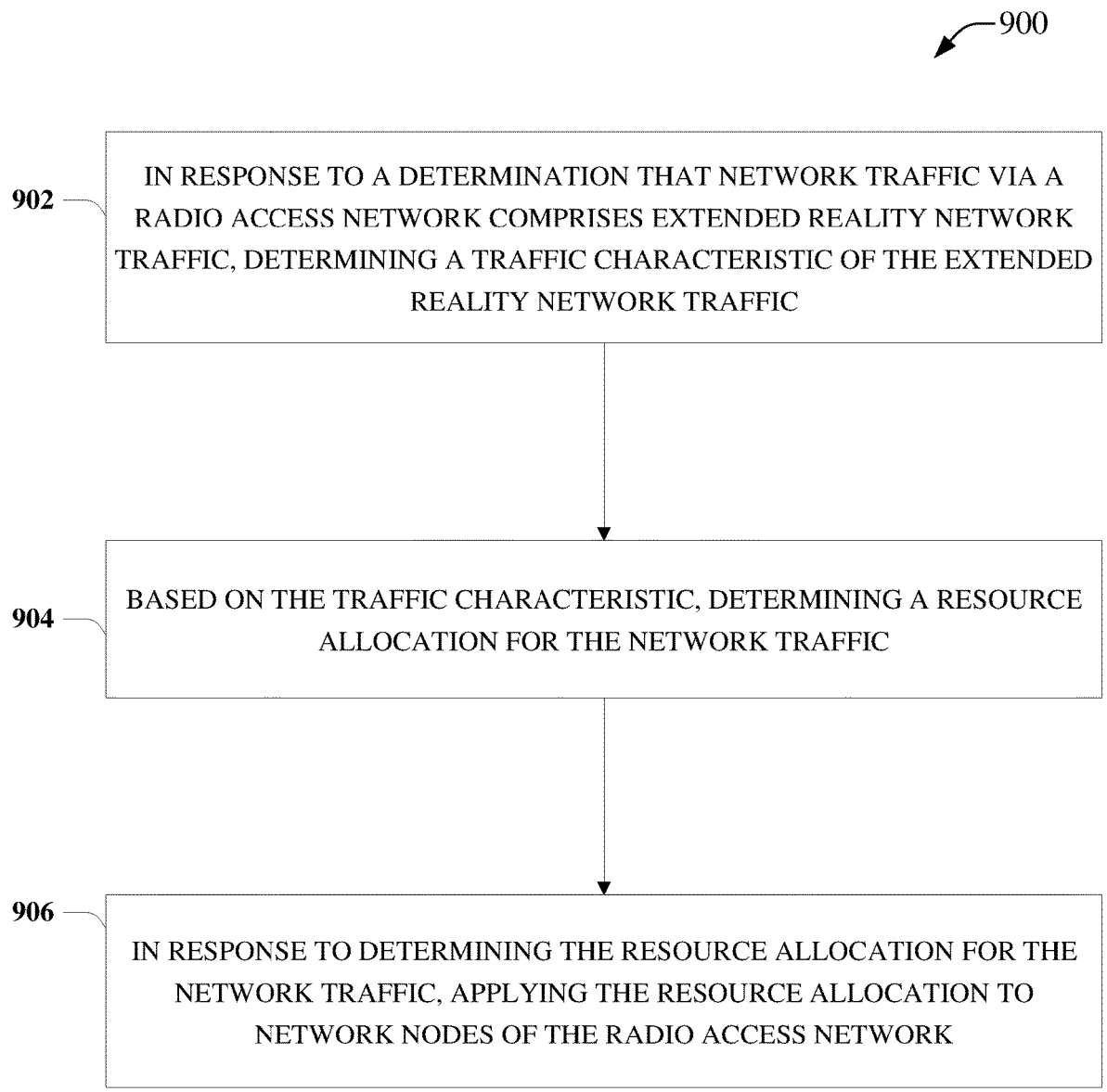
FIG. 9 is a block flow diagram for a process associated with resource allocation of network traffic in accordance with one or more embodiments described herein.

FIG. 9 illustrates a block flow diagram for a process 900 associated with resource allocation of network traffic in accordance with one or more embodiments described herein. At 902, the process 900 can comprise, in response to a determination (e.g., by the network traffic component 110) that network traffic via a radio access network comprises extended reality network traffic, determining (e.g., using the characteristic component 112) a traffic characteristic of the extended reality network traffic. At 904, the process 900 can comprise, based on the traffic characteristic, determining (e.g., using the resource allocation component 114) a resource allocation for the network traffic. At 906, the process 900 can comprise, in response to determining the resource allocation for the network traffic, applying (e.g., via a communication component 116) the resource allocation to network nodes of the radio access network.

Figure 10:
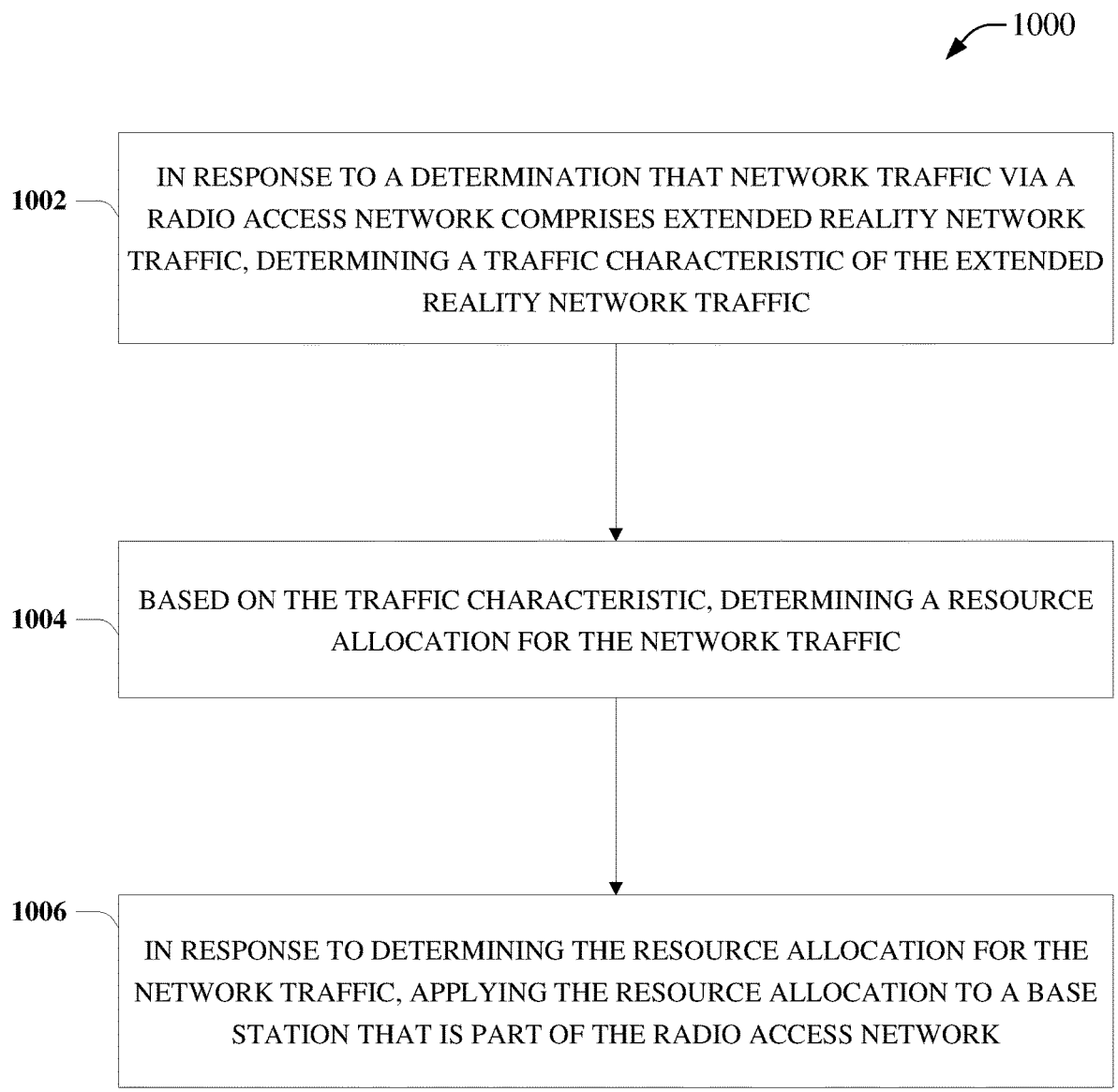
FIG. 10 is a block flow diagram for a process associated with resource allocation of network traffic in accordance with one or more embodiments described herein.

FIG. 10 illustrates a block flow diagram for a process 1000 associated with resource allocation of network traffic in accordance with one or more embodiments described herein. At 1002, the process 1000 can comprise, in response to a determination (e.g., by the network traffic component 110) that network traffic via a radio access network comprises extended reality network traffic, determining (e.g., using the characteristic component 112) a traffic characteristic of the extended reality network traffic. At 1004, the process 1000 can comprise, based on the traffic characteristic, determining (e.g., using the resource allocation component 114) a resource allocation for the network traffic. At 1006, the process 1000 can comprise, in response to determining the resource allocation for the network traffic, applying (e.g., via the communication component 116) the resource allocation to a base station that is part of the radio access network.

Figure 11:
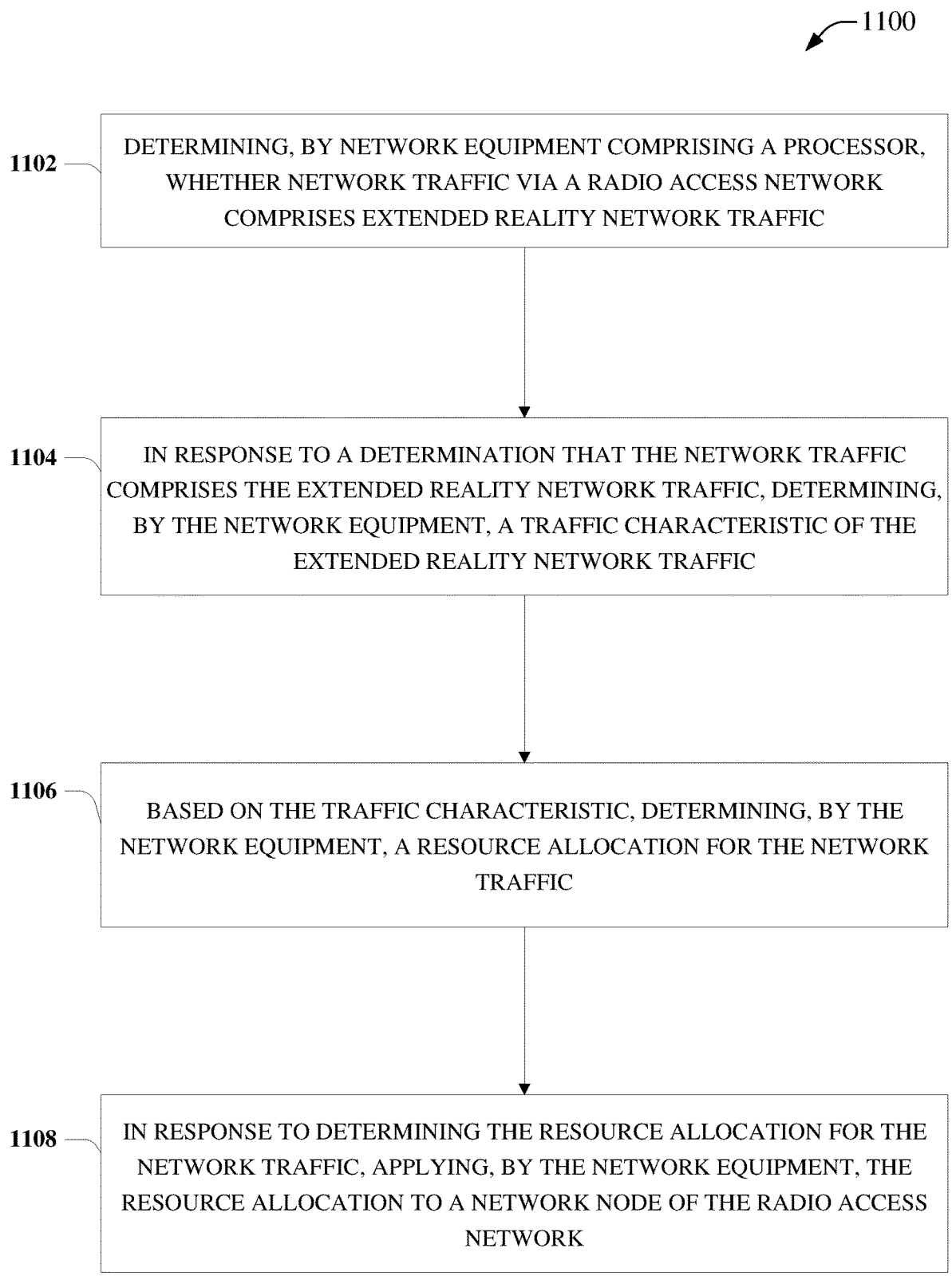
FIG. 11 is a block flow diagram for a process associated with resource allocation of network traffic in accordance with one or more embodiments described herein.

FIG. 11 illustrates a block flow diagram for a process 1100 associated with resource allocation of network traffic in accordance with one or more embodiments described herein. At 1102, the process 1100 can comprise determining, by network equipment comprising a processor (e.g., using a network traffic component 110), whether network traffic via a radio access network comprises extended reality network traffic. At 1104, the process 1100 can comprise, in response to a determination (e.g.., by the network traffic component 110) that the network traffic comprises the extended reality network traffic, determining, by the network equipment (e.g., using the characteristic component 112), a traffic characteristic of the extended reality network traffic. At 1106, the process 1100 can comprise, based on the traffic characteristic, determining, by the network equipment (e.g., using the resource allocation component 114), a resource allocation for the network traffic. At 1108, the process 1100 can comprise, in response to determining the resource allocation for the network traffic, applying, by the network equipment (e.g., via the communication component 116), the resource allocation to a network node of the radio access network.

Figure 12:
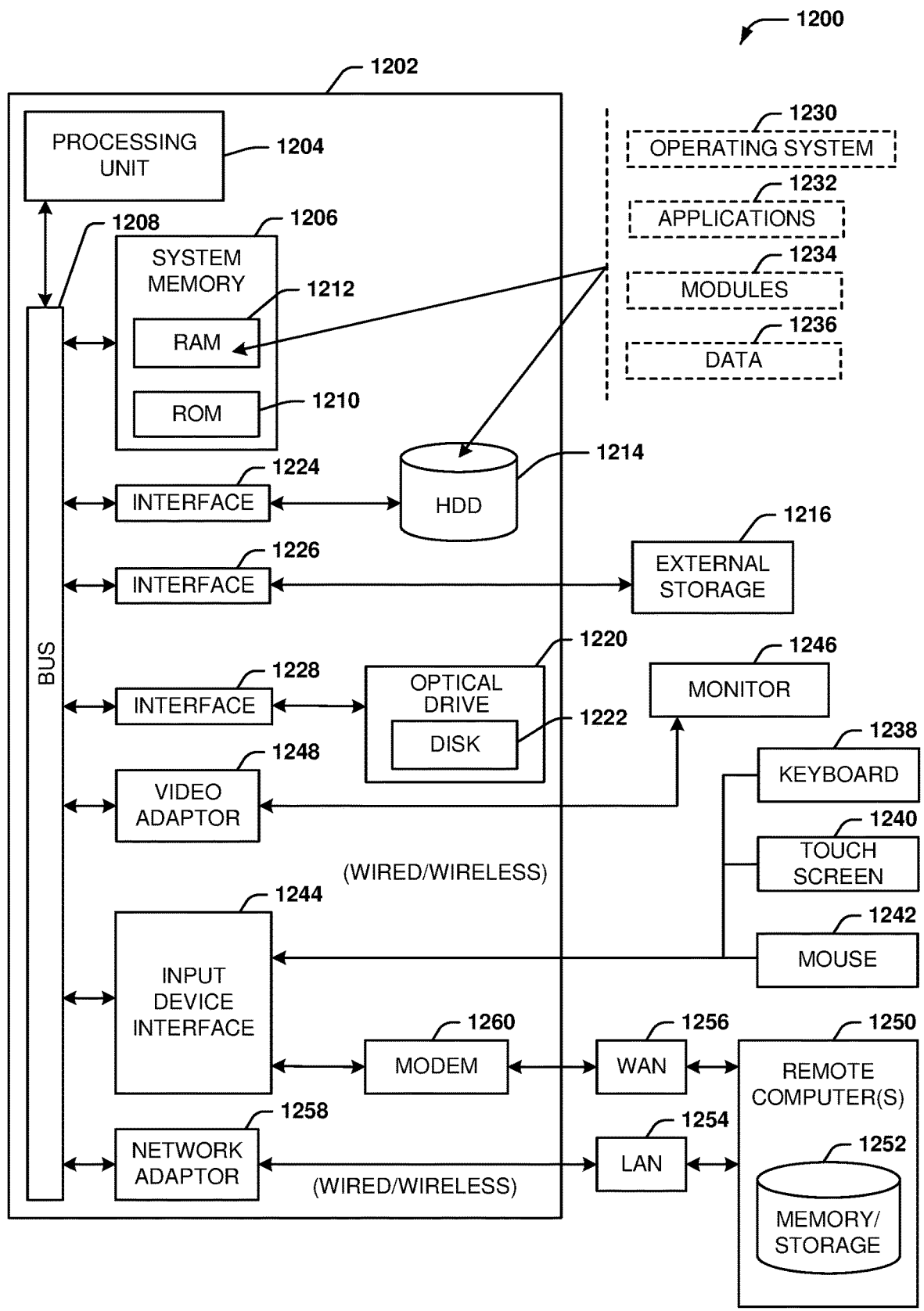
FIG. 12 is an example, non-limiting computing environment in which one or more embodiments described herein can be implemented.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
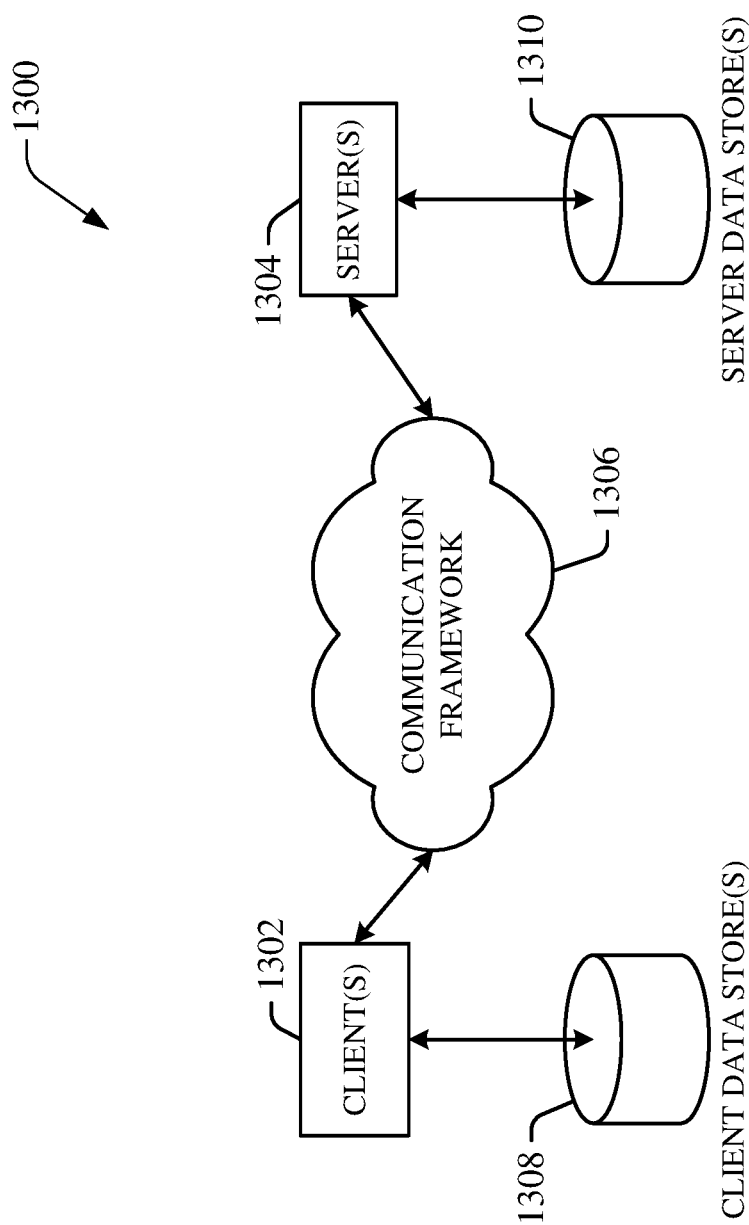
FIG. 13 is an example, non-limiting networking environment in which one or more embodiments described herein can be implemented.

Referring now to FIG. 13, there is illustrated a schematic block diagram of a computing environment 1300 in accordance with this specification. The system 1300 includes one or more client(s) 1302, (e.g., computers, smart phones, tablets, cameras, PDA's). The client(s) 1302 can be hardware and/or software (e.g., threads, processes, computing devices). The client(s) 1302 can house cookie(s) and/or associated contextual information by employing the specification, for example.

The system 1300 also includes one or more server(s) 1304. The server(s) 1304 can also be hardware or hardware in combination with software (e.g., threads, processes, computing devices). The servers 1304 can house threads to perform transformations of media items by employing aspects of this disclosure, for example. One possible communication between a client 1302 and a server 1304 can be in the form of a data packet adapted to be transmitted between two or more computer processes wherein data packets may include coded analyzed headspaces and/or input. The data packet can include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

In one exemplary implementation, a client 1302 can transfer an encoded file, (e.g., encoded media item), to server 1304. Server 1304 can store the file, decode the file, or transmit the file to another client 1302. It is noted that a client 1302 can also transfer uncompressed file to a server 1304 and server 1304 can compress the file and/or transform the file in accordance with this disclosure. Likewise, server 1304 can encode information and transmit the information via communication framework 1306 to one or more clients 1302.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
      in response to a determination that network traffic via a radio access network comprises extended reality network traffic, determining a defined extended reality traffic flow characteristic applicable to the extended reality network traffic;
      based on the defined extended reality traffic flow characteristic, determining a resource allocation for the network traffic, wherein determining the resource allocation comprises determining a weight that is applicable to maintain the defined extended reality traffic flow characteristic for the extended reality network traffic; and
      in response to determining the resource allocation for the network traffic, applying the resource allocation to network nodes of the radio access network.

2. The system of claim 1, wherein the defined extended reality traffic flow characteristic comprises a packet size distribution applicable to the extended reality network traffic.

3. The system of claim 2, wherein the packet size distribution is generated using a packet size distribution model, and wherein the packet size distribution model has been generated based on machine learning applied to past extended reality network traffic other than the extended reality network traffic.

4. The system of claim 3, wherein a parameter of the packet size distribution model comprises a direct parameter.

5. The system of claim 3, wherein a parameter of the packet size distribution model comprises an indirect parameter.

6. The system of claim 5, wherein the indirect parameter comprises a type of the packet size distribution model, an extended reality application type indication, a media codec type indication, or a quality of service mapping indication.

7. The system of claim 1, wherein the defined extended reality traffic flow characteristic comprises an inter-arrival time distribution between packets transmitted via the radio access network.

8. The system of claim 7, wherein the inter-arrival time distribution is generated using an inter-arrival time distribution model, and wherein the inter-arrival time distribution model has been generated based on machine learning applied to past inter-arrival times of other packets other than the packets.

9. The system of claim 1, wherein applying the resource allocation to the network nodes of the radio access network comprises sending a resource allocation policy indicative of the resource allocation to a radio access network node of the radio access network.

10. The system of claim 9, wherein sending the resource allocation policy to the radio access network node comprises:
    sending the resource allocation policy to the radio access network node per bearer of the radio access network, or
    sending the resource allocation policy to the radio access network node per flow identifier of the radio access network.

11. The system of claim 10, wherein a first mapping of the resource allocation policy to the radio access network node per bearer of the radio access network comprises a first one-to-one mapping of the defined extended reality traffic flow characteristic per bearer, or a second mapping of the resource allocation policy to the radio access network node per flow identifier of the radio access network comprises a second one-to-one mapping of the defined extended reality traffic flow characteristic per flow identifier.

12. A non-transitory machine-readable medium, comprising executable instructions that, when executed by a processor, facilitate performance of operations, comprising:
 in response to a determination that network traffic via a radio access network comprises extended reality network traffic, determining a defined extended reality traffic flow characteristic applicable to the extended reality network traffic;
 based on the defined extended reality traffic flow characteristic, determining a resource allocation for the network traffic, wherein determining the resource allocation comprises determining a weight that is applicable to maintain the defined extended reality traffic flow characteristic with respect to the extended reality network traffic; and
 in response to determining the resource allocation for the network traffic, applying the resource allocation to a base station that is part of the radio access network.

13. The non-transitory machine-readable medium of claim 12, wherein the operations further comprise:
 requesting, from a user equipment executing an extended reality application applicable to the extended reality network traffic, assistance data representative of raw data or quantized statistics of extended reality data packets or flows transmitted via the radio access network.

14. The non-transitory machine-readable medium of claim 12, wherein the operations further comprise:
 based on the defined extended reality traffic flow characteristic, generating a scheduling metric applicable to the extended reality network traffic.

15. The non-transitory machine-readable medium of claim 14, wherein generating the scheduling metric applicable to the extended reality network traffic comprises generating the scheduling metric applicable to the extended reality network traffic per user equipment of the radio access network, per bearer of the radio access network, or per group flow of the radio access network.

16. The non-transitory machine-readable medium of claim 12, wherein the operations further comprise:
 based on the defined extended reality traffic flow characteristic, modifying a semi-static resource allocation grant applicable to the radio access network.

17. The non-transitory machine-readable medium of claim 16, wherein modifying the semi-static resource allocation grant is based on a historical extended reality traffic flow characteristic with respect to the extended reality network traffic.

18. A method, comprising:
 determining, by network equipment comprising a processor, whether network traffic via a radio access network comprises extended reality network traffic;
 in response to a determination that the network traffic comprises the extended reality network traffic, determining, by the network equipment, a traffic characteristic applicable to the extended reality network traffic, wherein the traffic characteristic comprises a defined extended reality traffic flow characteristic;
 based on the defined extended reality traffic flow characteristic, determining, by the network equipment, a resource allocation for the network traffic, wherein determining the resource allocation comprises determining a weight that is applicable to maintain the defined extended reality traffic flow characteristic for the extended reality network traffic; and
 in response to determining the resource allocation for the network traffic, applying, by the network equipment, the resource allocation to a network node of the radio access network.

19. The method of claim 18, further comprising:
 based on the defined extended reality traffic flow characteristic, modifying, by the network equipment, a dynamic resource allocation grant applicable to the radio access network.

20. The method of claim 19, wherein modifying the dynamic resource allocation grant is based on a predicted extended reality traffic flow characteristic predicted to be applicable to the extended reality network traffic.

* * * * *